United States Patent [19]

Castan

[11] Patent Number: 4,886,534
[45] Date of Patent: Dec. 12, 1989

[54] PROCESS FOR APPARATUS FOR CRYOGENIC COOLING USING LIQUID CARBON DIOXIDE AS A REFRIGERATING AGENT

[75] Inventor: Joseph Castan, Herblay, France

[73] Assignee: Societe Industrielle de l'Anhydride Carbonique, France

[21] Appl. No.: 227,651

[22] Filed: Aug. 3, 1988

[30] Foreign Application Priority Data

Aug. 4, 1987 [FR] France ................ 87 11237

[51] Int. Cl.$^4$ ................................. B29C 3/00
[52] U.S. Cl. ................... 62/35; 62/48.2; 62/384
[58] Field of Search ............... 62/54, 384, 35

[56] References Cited

U.S. PATENT DOCUMENTS

| | | | |
|---|---|---|---|
| 2,848,879 | 8/1958 | Hesson | 62/54 |
| 2,880,594 | 4/1959 | Hesson | 62/54 |
| 2,893,216 | 7/1959 | Seefeldt et al. | 62/384 |
| 3,443,389 | 5/1969 | Townsend et al. | 62/35 |
| 3,807,187 | 4/1974 | Vorel | 62/384 |
| 4,166,364 | 9/1979 | Ruprecht et al. | 62/384 |

Primary Examiner—Ronald C. Capossela
Attorney, Agent, or Firm—Connolly & Hutz

[57] ABSTRACT

Cooling by carbon dioxide. The apparatus comprises:
as an expansion member, at least one appliance (5) for the expansion and separation of the solid and gaseous phases, which is interposed between the pipe (3) and the chamber (4) and which has a gaseous-phase outlet and a solid-phase outlet communicating with the chamber via a sealing means (10),
a gaseous-phase recovery pipeline (15) connected to the gaseous-phase outlet of the appliance (5),
a compressor (16) fed by the recovery pipeline (15),
and a means (17) for liquefying the gaseous phase for the purpose of re-using it.

Application for the deep-freezing of food products.

22 Claims, 4 Drawing Sheets

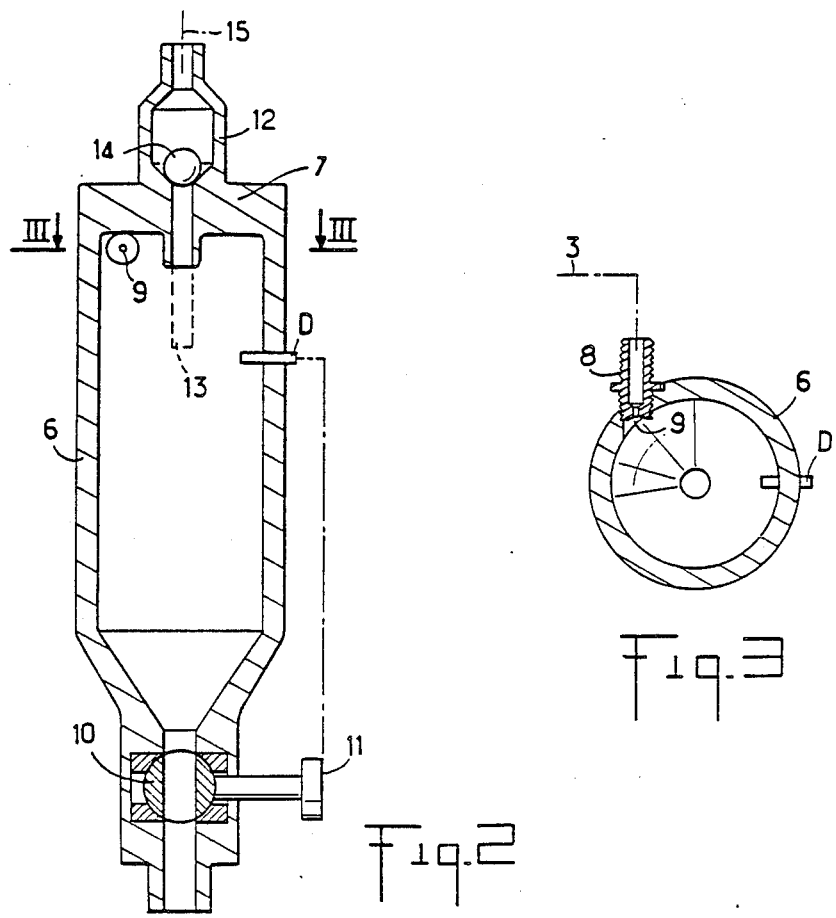
Fig. 2
Fig. 3
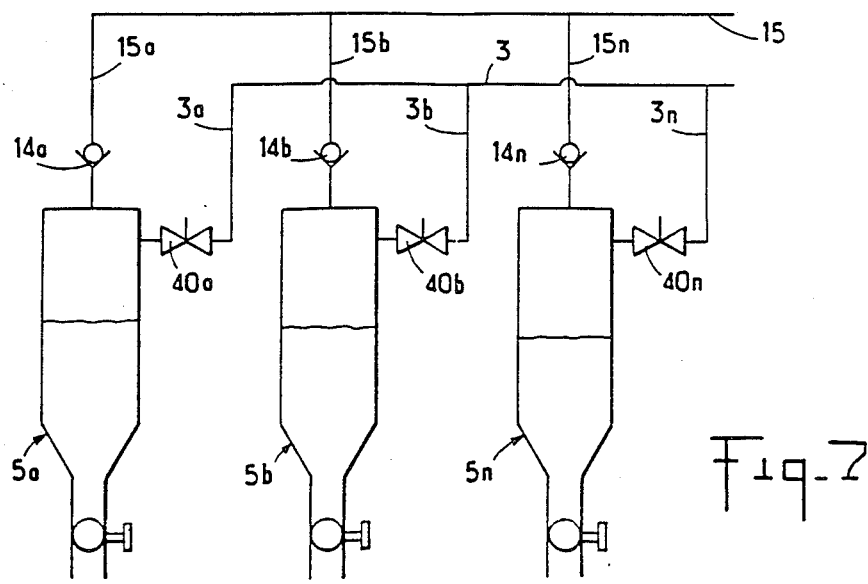
Fig. 7

PROCESS FOR APPARATUS FOR CRYOGENIC COOLING USING LIQUID CARBON DIOXIDE AS A REFRIGERATING AGENT

The present invention relates to the technical sector of the use of liquid carbon dioxide as a lostfluid refrigerating agent, for example for the cooling or deep-freezing of food products or for the rapid cooling of industrial products or components.

In the above sector, the carbon dioxide is generally liquefied and stored in an isothermal tank, usually being maintained at a pressure of between 17 and 25 bars absolute and at a temperature of between 249 and 261° K.

Refrigerating production from carbon dioxide in the liquid phase is obtained as a result of the expansion of this phase at a pressure below that of the triple point, the coordinates of which are 5.18 bars absolute and 216.5° K. Most often, the expansion takes place at a pressure near the atmospheric pressure. Below a pressure equal to 5.18 bars absolute, the expansion of the carbon dioxide in the liquid phase can produce only a sold phase and a gaseous phase.

The refrigerating capacity of carbon dioxide in the liquid phase is evaluated by means of the variation in enthalpy between a final state corresponding to a working pressure and temperature and an initial state corresponding to a storage pressure and temperature.

As an example, a kilogram of liquid carbon dioxide taken at 20.9 bars absolute and at 255° K. and expanded to a gaseous phase at one bar absolute and at 253° K. absorbs 73.8 kilocalories or, in other words, produces 73.8 negative kilocalories (nkc). The expansion of a kilogram of liquid carbon dioxide under the above conditions provides 0.46 kg of solid and 0.54 kg of gas. Now it is known that, during this expansion, the refrigerating capacity of the carbon dioxide is concentrated essentially in the solid phase. It would therefore be of great usefulness if at least some of the gaseous phase produced as a result of the expansion could be recovered.

In the conventional storage and conversion installations, the carbon dioxide is stored in the liquid phase in a main tank, from which it is extracted and conveyed via a pipe to a usually heat-insulated operating chamber, in which it is expanded by means of a calibrated nozzle.

The solid/gas ratio obtained during expansion in the heat-insulated chamber is generally lower than that given above and resulting from the calculation, because of the heat losses occurring along the transfer pipe.

Such an installation is therefore incapable, and indeed quite incapable, of improving the practical refrigerating capacity of the carbon dioxide in the liquid phase.

In the prior art, there is also known a proposal involving causing the expansion of the liquid carbon dioxide in a chamber substantially at atmospheric pressure, in order to provide dry ice which is subsequently transported to the point of use and dispersed mechanically into the operating chamber. This solution is unsatisfactory because the logistical chain which it implies encounters considerable difficulties as regards both storage and transport and execution at the place of use (binding, arching, sublimation, etc.)

A process which is also known involves recovering the gaseous carbon dioxide at the outlet of a heat-insulated chamber after its refrigerating capacity has been utilized, in order to compress it and liquefy it once again. Such a process is extremely costly both in terms of investment, because it requires complex purification and drying operations added to multi-stage compression, and in terms of energy because the recovered gas is usually at a pressure near 1 bar absolute. Such a process is of no economic use.

SUMMARY OF THE INVENTION

The present invention is aimed precisely at proposing a new cooling technique making it possible to improve the economy of cryogenic cooling by the recovery of the gaseous phase produced as a result of the expansion of the liquid carbon dioxide.

The object of the invention is to propose a process and an apparatus for cryogenic cooling making it possible, at minimum cost, to recover the gaseous phase produced during expansion, in order, after compression and liquefaction, to recycle it in the circuit of liquid carbon dioxide for the purpose of re-using it.

To achieve the above object, the recovery process according to the invention involves:

causing the expansion of the liquid carbon dioxide in at least one expansion and separation appliance located upstream and preferably in the immediate vicinity of an operating chamber, extracting from this appliance, on the one hand, the carbon dioxide in solid form, in order to expel it and disperse at in the chamber, and, on the other hand, the carbon dioxide in gaseous form produced as a result of expansion, compressing the gaseous phase extracted, and liquefying this compressed gaseous phase for the purpose of re-using it.

The invention is also aimed at an apparatus for recovering the gaseous phase produced as a result of the expansion of the liquid carbon dioxide used as a refrigerating agent, this apparatus being characterized in that it comprises:

as an expansion member, at least one appliance for the expansion and separation of the solid and gaseous phases, which is interposed between the pipe and the chamber and which has a gaseous-phase outlet and a solid-phase outlet communicating with the chamber via a sealing means, a gaseous-phase recovery pipeline connected to the gaseous-phase outlet of the appliance, a compressor fed by the recovery pipeline, and a means for liquefying the gaseous phase for the purpose of re-using it.

Various other characteristics emerge from the description given below with reference to the accompanying drawings which illustrate embodiments of the subject of the invention as non-limiting examples.

THE DRAWINGS

FIG. 2 is a sectional elevation showing a component element of the apparatus on a larger scale.

FIG. 3 is a cross-section taken along the line III—III of FIG. 2.

FIG. 7 is a diagrammatic view illustrating a development of the invention.

DETAILED DESCRIPTION

Figure 1:
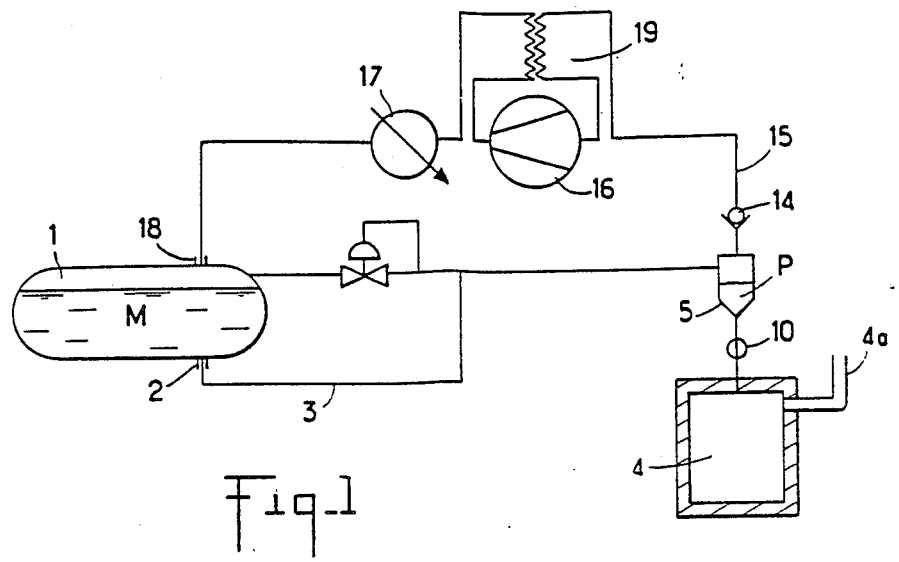
FIG. 1 is a diagrammatic view of a first cooling apparatus according to the invention.

FIG. 1 illustrates an apparatus for carrying out the cooling process from liquid carbon dioxide used as a refrigerating agent. Such an apparatus comprises a main storage tank 1 extended, stating from a drawing-off connection 2, by a pipe leading to an operating chamber 4 equipped with a vent 4l. The pipe 3 is equipped, upstream of the operating chamber 4, with an expansion/-separation appliance 5 of any suitable type, preferably located near the chamber 4 which is produced in such a way as to form a volume which is, if not isothermal, at least heat-insulated. The appliance 5 illustrated in FIGS. 2 and 3 is produced, for example, in the form of a cyclone and comprises a cylindrical and frustoconical tubular body 6 equipped, in its cylindrical part and near its transverse wall 7, with a tangential connection 8 for mounting the pipe 3. The connection 8 is equipped with a calibrated nozzle 9 forming a sprayer. The frustoconical part is connected to the chamber 4 via a sealing means 10 of the spherical type, actuated by means of a control 11 put under the dependence of a level detector D carried by the body 6 or of a delay means or else of any intermittently operating device. The control 11 is designed to ensure the delayed opening of the sealing means 10, whenever the body 6 is at least partially filled with dry ice. The body 6 is equipped, on its wall 7, with a connection 12 equipped with a filter 13 and a calibrated or ballasted non-return valve 14. The connection 12 is connected to a recovery pipeline 15 leading to the inlet of a compressor 16, the outlet of which is connected to the exchanger of a refrigerating machine 17, itself connected to an intake connection 18 of the storage tank 1.

In a conventional way, the tank 1 ensures the storage of a mass M of carbon dioxide in the liquid phase, generally maintained at a pressure of between 17 and 25 bars absolute and at a temperature of between 249° K. and 261° K.

According to the invention, the liquid phase of the carbon dioxide is extracted from the tank 1 by means of the drawing-off pipe 3, for example at 20.9 bars absolute and at 255° K. The liquid phase conveyed in this way is expanded in the appliance 5 by means of the calibrated nozzle 9, the characteristics of which are selected so as to maintain an expansion at a pressure of between 1 and 5.18 bars absolute and preferably between 4.5 and 5.18 bas absolute. This expansion causes the formation of a solid phase P in the appliance 5, from which it is extracted as a result of the temporary opening of the sealing means 10, in order to be expelled into the chamber 4, in which a pressure prevails which is always below that existing in the appliance 5.

The gaseous fraction produced as a result of the expansion and as a result of the heat losses occurring along the pipe 3 is taken up by the recovery pipeline 15, in order to be conveyed to the compressor 16 responsible for returning this gaseous phase to a pressure of the order of the drawing-off pressure, for example 20.9 bars absolute. At the outlet of the compressor, the compressed gaseous phase is liquefied by passing through the evaporator of the refrigerating machine 17, the condenser of which is cooled either by water or by air or by any other suitable means.

According to one arrangement of the invention, the refrigerating machine 17 is of the type maintaining a temperature of 238 to 233° K. at the evaporator. Such a machine can, for example, be of the type with reciprocating pistons or with screws, functioning with a refrigerating fluid, such as freon R 502, or can form part of a unit operating with ammonia, as is known in the art of the production of cold in cold stores particularly.

As emerges from the foregoing, the gaseous phase extracted from the appliance 5 is recovered at a pressure of the order of expansion pressure, that is to say preferably between 4.5 and 5.18 bars absolute. The compressor 16 responsible for returning this gaseous phase to the original pressure of 20.9 bars absolute must therefore put into effect only a relatively low compression ratio located between 4.64 and 4.03. An apparatus of this type is inexpensive in terms of design and operation and makes it possible for the essential part of the carbon dioxide produced in the gaseous phase as the result of expansion to be recycled in the liquid phase and taking advantage of the operation of a refrigerating machine. Under theoretical conditions, such a process can be considered capable of recovering approximately 50% of the mass of liquid carbon dioxide drawn off and expanded in the appliance 5. It thus becomes possible to consider that, by implementing the process and an apparatus according to the invention, the enthalpy of the cryogenic fluid can be lowered, so that the state of the useful carbon dioxide generating the refrigerating capacity is in the neighbourhood of the 100% solid state.

According to the process of the invention, a fraction of the gaseous phase produced in the appliance 5 as a result of the expansion of the liquid carbon dioxide is preserved in this appliance, because of the presence of the sealing means 10, at a pressure which can be substantially the expansion pressure. This gaseous phase represents a motor agent for expelling and dispersing the solid carbon dioxide as soon as the impervious sealing means 10 has been opened. To keep this fraction of gaseous phase inside the appliance 5, the impervious sealing means is usually of the rotary type with a cylindrical, conical or preferably spherical tap.

It is appropriate to note that the compressed gaseous phase produced by the compressor 16 is at a temperature which is still low, of the order of 313° K. It thus becomes possible to cause its liquefaction simply by passage through the evaporator of a refrigerating machine 17 of a type which is, if not ordinary, at least conventional in the industry. Moreover, the gaseous phase is extracted from the appliance 5 located upstream of the chamber 4 and is therefore free of pollution coming from the latter. A recycling without treatment can thus be carried out.

To improve the operating conditions of the compressor 16, it would be possible to connect its outlet to the machine 17 not directly, but via an exchanger 19, and make the gaseous phase extracted via the pipeline 15 pass through this exchanger (FIG. 1).

Figure 4:
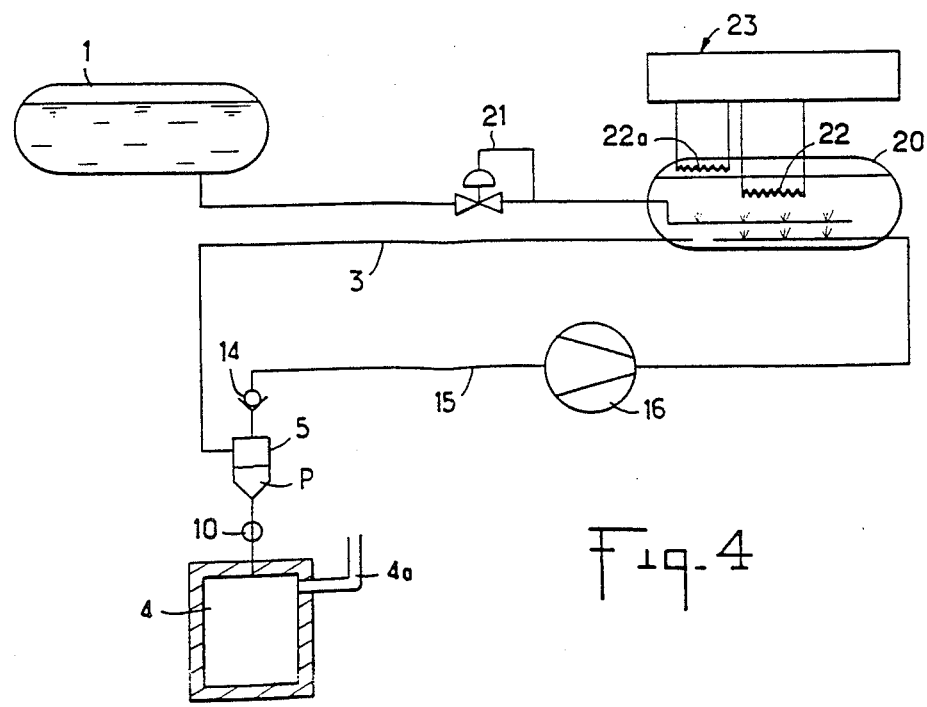
FIGS. 4 to 6 are two diagrammatic views illustrating two alternative embodiments of the apparatus according to FIG. 1.

FIG. 4 illustrates an alternative version of the invention which involves connecting the outlet of the compressor 16 to an intermediate storage tank 20, from which the drawing-off pipe 3 leads. The intermediate storage tank is fed by the main storage tank via a relief valve 21. The intermediate tank 20 is associated with the evaporators 22 and 22a of a refrigerating machine 23 of any suitable type, which as a result of its operation is capable of maintaining the liquefaction of the compressed gaseous phase supplied by the compressor 16 and of keeping the fraction of carbon dioxide supplied by the main storage tank 1 in the liquid phase.

An especially suitable refrigerating machine is of the type capable of maintaining intermediate storage in the liquid phase at a pressure near 13 bars absolute and at a temperature below 241° K. Such a machine must have an evaporator capable of maintaining a temperature of between 238° K. and 233° K.

In this alternative version, the compression energy expended by the compressor 16 is reduced in comparison with that necessary in the first example described with reference to FIG. 1. The compression ratio maintained by the compressor 16 is thus brought to a distinctly lower value, for example between 2.88 and 2.5.

Figure 5:
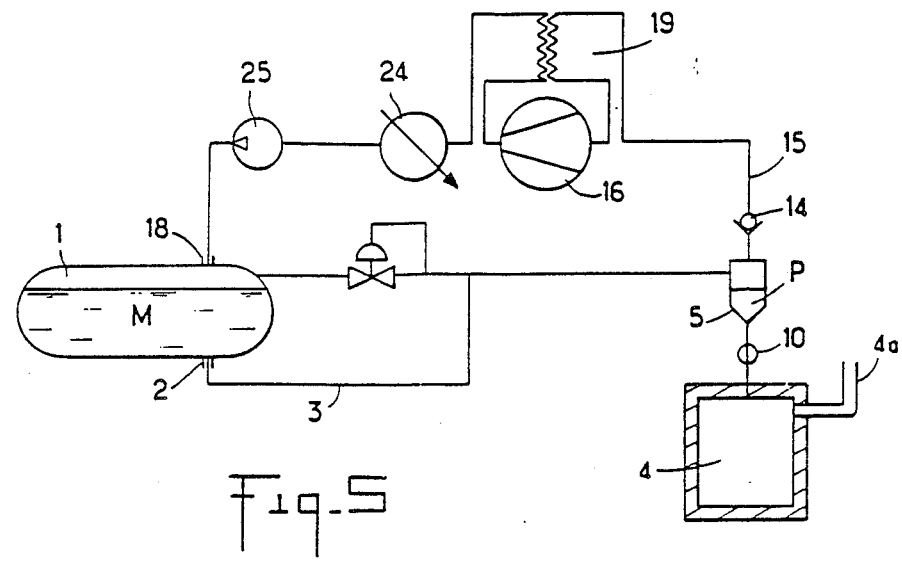

Of course, a similar reduction in the compression ratio could also be obtained by carrying out the liquefaction of the gaseous phase compressed by the compressor 16 by means of a refrigerating machine 24, as indicated in FIG. 5, this liquefaction being carried out at a pressure substantially below that of the tank 1, for example 13 bars.

A pump 25 is then provided between the refrigerating liquefier 24 and the tank 1 in order to reintroduce the liquid into this.

Figure 6:
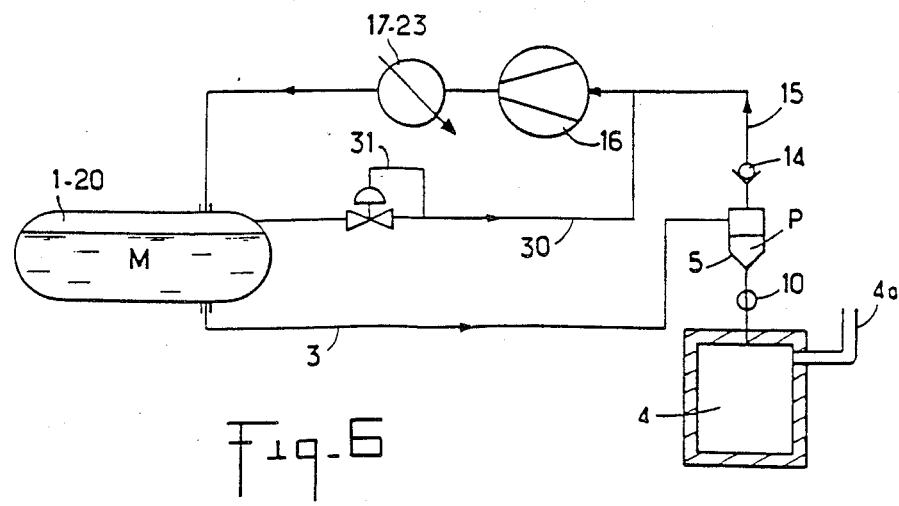

FIG. 6 illustrates a development used to maintain a constant-load operation of the compressor 16 and, if appropriate, of the liquefaction means 17 or 23.

In the apparatuses of the type described above, it is customary for the demand for the use of carbon dioxide as a refrigerating agent to be subject to irregularity. To prevent this irregularity from affecting the compressor 16, FIG. 6 illustrates a development involving connecting the inlet of the compressor 16 to a looping pipeline 30 equipped with a regulator 31 and connected to the storage tank 1 or 20. Pipeline 30 is connected to the part of the tank located above the maximum filling level of the liquid phase. Thus, in the absence of a gaseous phase supplied by the recovery pipeline 15, the compressor 16 extracts directly, via the pipeline 30, the gaseous phase necessary for establishing regular continuous compression and liquefaction operation. Such an apparatus is made possible by the presence of the valve 14 preventing circulation between the pipeline 15 and the appliance 5.

FIG. 7 shows that the process according to the invention and the apparatus for carrying it out can be provided for supply to and recovery from several appliances 5a to 5n. In such case, the appliances 5 are connected in parallel from a drawing-off pipe 3 by mans of branches 3a to 3n equipped with cocks 40a to 40n and are connected, likewise in parallel, to the recovery pipeline 15 by means of offtakes 15a to 15n. Each offtake 15a to 15a is equipped with a non-return valve 14 which allows only a circulation of the gaseous phase of the carbon dioxide from the corresponding appliance towards the compressor 16.

Figure 8:
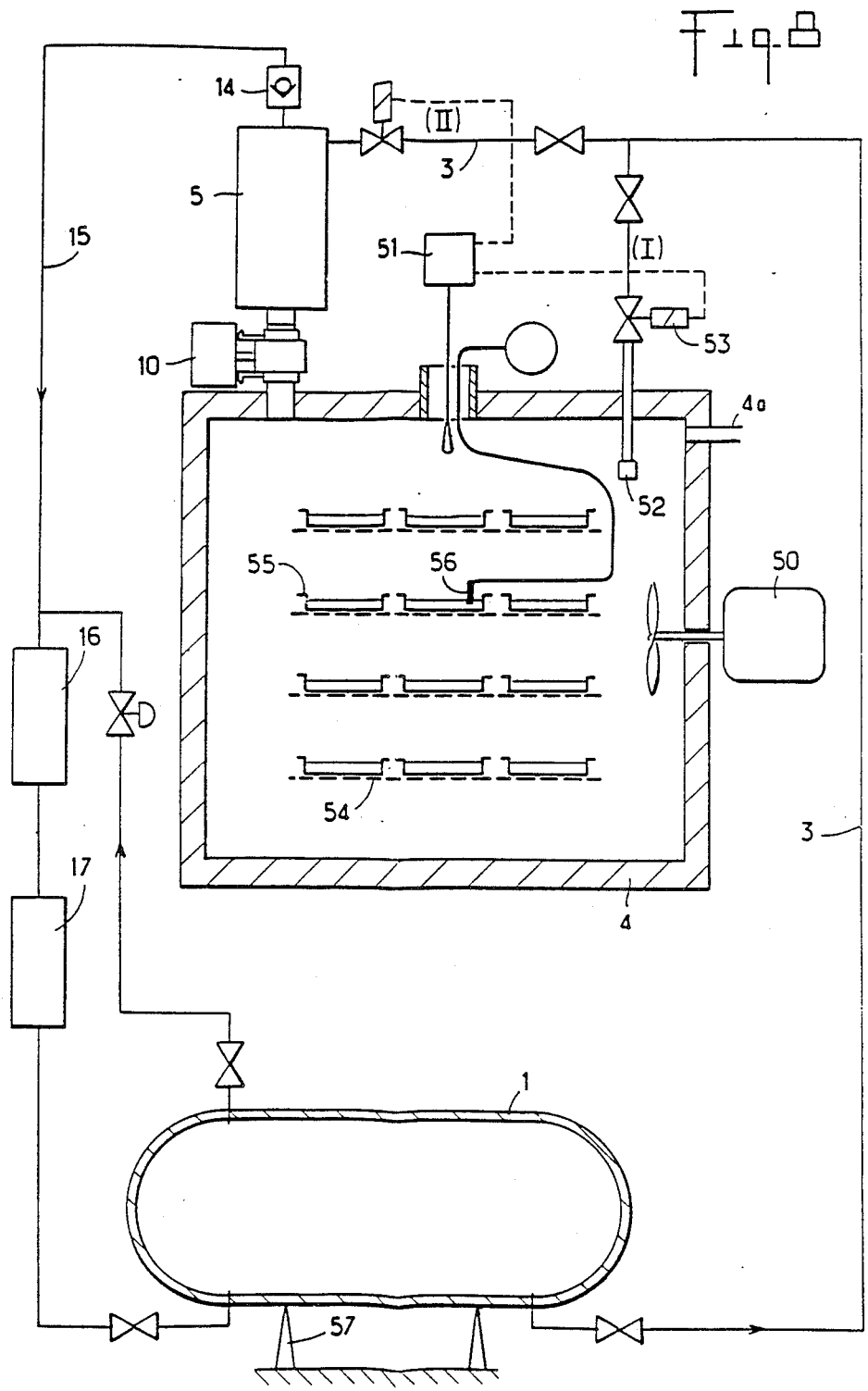
FIG. 8 is a diagrammatic view illustrating a practical example for carrying out the invention.

FIG. 8 illustrates, by way of example, a cryogenic cooling apparatus comprising a heat-insulated chamber 4 of internal dimensions 900 mm×900 mm×700 mm, equipped with polyurethane-foam insulating walls 80 mm thick, with a motor fan 50 and with a thermostat 51. The chamber 4 is connected to an apparatus of the type shown in FIG. 1 via:

a conventional system (I) utilizing a sprayer 52 inside the chamber and a solenoid valve 53, a system according to the invention including an appliance 5 capable of the continuous supply of 10 kg/h of dry ice from liquid carbon dioxide.

Arranged inside the chamber and at four levels at a distance of 80 mm from one another are grids 54 supporting a total of twenty-four uncovered trays 55, each of the dimensions 265 mm×325 mm×50 mm, which are loaded with food products.

The effective load to be cooled is $0.8 \times 24 = 19.2$ kg.

All the conditions being equal at the start and at the end of the test (that is to say, +60° C. and 10° C. measured by a thermocouple 56 on a control tray), the following average consumptions were recorded over three tests by reading the variation in weight of the tank 1 placed on a weighing system 57:
conventional process (I): 23.3 kg
process according to the invention (II): 13.6 kg It is expedient to mention, as an additional advantage of the invention, that the flow of cold gaseous carbon dioxide leaving the chamber 4 via the vent 4a after giving off its negative kilocalories is reduced substantially in comparison with the conventional process. Thus, the losses of negative kilocalories resulting from the escape of cold gases are reduced substantially thereby.

The invention is not limited to the examples described and illustrated, because many modifications can be made to it without departing from its scope. The recycling of pure gaseous $CO_2$ combined with the automatic and continuous way the whole process is operated is the most attractive feature of the invention.

It enables substantial savings for cryogenic commercial applications which could never be achieved in practice using the prior art technique.

Thus, for example, it is of course also possible to use the process described or the apparatuses described for producing dry ice, and the dry ice can take the form of a block, snow, chips or granules (pellets). It is especially advantageous if, in the invention, the re-use/recycling of the gaseous $CO_2$ obtained during evaporation is carried out in a closed circuit, in which a connection of the circuit to the atmosphere is prevented both during the production of the dry ice and also in the operating intervals, for example via appropriate closing apparatuses. As a result, contamination of the gaseous $CO_2$, for example by air penetrating it or the atmosphere of the refrigerating tank penetrating it, is prevented and a gaseous $CO_2$ having the same degree of purity as the liquid $CO_2$ is recycled.

I claim:

1. In a process for cryogenic cooling including the steps of expanding the liquid $CO_2$ cooling agent in at least one expansion and separation appliance upstream and in the vicinity of an operating chamber, extracting the $CO_2$ in solid form from the appliance to expel and disperse it into the chamber in a discontinuous manner, and returning the $CO_2$ in its gaseous phase from the appliance to a tank via a reliquefaction circuit not connected to the atmosphere, the improvement being utilizing a pressure up to 5.18 bars for the expansion and separation, and extracting the gaseous $CO_2$ between two phases of expulsion of the solid $CO_2$ as a result of expansion inside the expansion and separation appliance.

2. Process according to claim 1, characterized in that the separation takes place at a pressure of between 1 and 5.18 bars.

3. Process according to claim 1, characterized in that the separation takes place in a cyclone-like appliance.

4. Process according to claim 1, characterized in opening a valve intermittently in the appliance as an outlet for the solid $CO_2$.

5. Process according to claim 4, characterized in continuously drawing off the unpolluted gaseous $CO_2$ from the separation appliance when the valve is closed and opening the valve every 10 seconds o 5 minutes for the duration of 0.5 to 10 seconds, and drawing-off the gaseous $CO_2$ from the separation appliance during the entire duration.

6. Process according to claim 5, characterized in opening the valve every 15 seconds to 2 minutes for a duration of 0.5 and 2 seconds.

7. Process according to claim 1, characterized in feeding the solid $CO_2$ to an appliance producing dry snow or ice in various forms.

8. Process according to claim 1, characterized in the solid $CO_2$ as a refrigerating medium through an appliance utilizing a refrigerating medium.

9. Cooling process according to claim 1, characterized in reintroducing the recompressed, reliquified recovered gaseous phase, into the storage tank in liquid form.

10. Cooling process according to claim 1, characterized in introducing the recompressed, reliquified recovered gaseous phase into an intermediate storage tank fed by the main storage tank.

11. Cooling process according to claim 9 or 10, characterized in connecting the inlet of the compressor to a looping circuit coming from the storage tank.

12. Cooling process according to claim 10 or 11, characterized in storing the carbon dioxide in liquid form in an intermediate storage tank at a pressure below that of the main tank.

13. Process according to claim 1, characterized in that the separation takes place at a pressure of between 4.5 and 5.18 bars.

14. Cryogenic cooling apparatus using liquid carbon dioxide as a refrigerating agent, of a type comprising a storage tank, a drawing-off pipe equipped with a regulating member leading from said tank to an operating chamber, characterized in that said apparatus comprises:

as an expansion member, at least one appliance for the expansion and separation of the solid and gaseous phases, said appliance communicating with said pipe and with said chamber, said appliance having a gaseous-phase outlet and a solid-phase outlet communicating with said chamber via a sealing means, a gaseous-phase recovery pipeline connected to said gaseous-phase outlet of said appliance, a compressor fed by said recovery pipeline, and a means for liquefying the gaseous phase for the purpose of re-using it.

15. Apparatus according to claim 14, characterized in that said expansion and separation appliance is of the cyclone type and has a tangential intake for liquid carbon dioxide and an outlet sealing means with sequential opening controlled by a detector for detecting the solid-phase filling level of said appliance.

16. Apparatus according to claim 14, characterized in that said outlet of the liquefaction means is connected to said storage tank.

17. Apparatus according to claim 14, characterized in that said compressor is connected to an intermediate storage tank associated with a refrigerating machine and connected to said appliance and on the other hand to said main storage tank.

18. Apparatus according to claim 17, characterized in that said refrigerating machine has an evaporator dipping into the liquid phase of said intermediate storage tank.

19. Apparatus according to claim 16, 17 or 18, characterized in that the inlet of the compressor is connected to said storage tank via a looping circuit.

20. In an expansion and separation appliance for cryogenic cooling with liquid $CO_2$ refrigerating agent in a system including a storage tank having a drawing-off pipeline leading to an operating chamber through said appliance, with said appliance being upstream of said operating chamber, said appliance separating said $CO_2$ into a slid phase and a gaseous phase, said appliance communicating with a compressor and a reliquefaction circuit for returning the gaseous phase of the $CO_2$ to said tank, the improvement being in that said appliance includes a cylindrical body having a lower frustoconical end, a transverse face closing said cylindrical body at its top end, a connection creating communication at said transverse face between the interior of said body and a recovery pipeline leading to said circuit, a connection piece tangentially communicating with the interior of said body, said connection piece having a sprayer within said body, said connection piece communicating with said drawing-off pipeline, and said frustoconical end having a sequentially opening sealing means.

21. Appliance according to claim 20, characterized in that connection has a non-return valve preventing circulation between said recovery pipeline and said expansion and separation appliance.

22. Appliance according to claim 21, characterized in a solid-phase filling level detector controlling said delayed sequential opening of the sealing means.

* * * * *